(12) United States Patent
Lewis et al.

(10) Patent No.: US 9,921,383 B2
(45) Date of Patent: Mar. 20, 2018

(54) HIGH-DENSITY MODULAR WDM SYSTEM—HIGH DENSITY PASSIVE FIBER MODULE (PFM), TRAY AND CHASSIS INTERCHANGEABLE SOLUTION

(71) Applicant: Champion Optical Network Engineering, LLC, Beachwood, OH (US)

(72) Inventors: Keith Lewis, Brecksville, OH (US); Oceanus Perry, Jr., Twinsburg, OH (US); Paul A. Hospodar, Strongsville, OH (US)

(73) Assignee: Champion Optical Network Engineering, LLC, Beachwood, OH (US)

( * ) Notice: Subject to any disclaimer, the term of this patent is extended or adjusted under 35 U.S.C. 154(b) by 0 days.

(21) Appl. No.: 14/862,243

(22) Filed: Sep. 23, 2015

(65) Prior Publication Data
US 2016/0085042 A1 Mar. 24, 2016

Related U.S. Application Data

(60) Provisional application No. 62/054,489, filed on Sep. 24, 2014.

(51) Int. Cl.
*G02B 6/00* (2006.01)
*G02B 6/44* (2006.01)

(52) U.S. Cl.
CPC ......... *G02B 6/4453* (2013.01); *G02B 6/4446* (2013.01); *G02B 6/4452* (2013.01); *G02B 6/4471* (2013.01)

(58) Field of Classification Search
CPC .................. G02B 6/4446; G02B 6/4453
See application file for complete search history.

(56) References Cited

U.S. PATENT DOCUMENTS

| | | | |
|---|---|---|---|
| 6,200,159 B1* | 3/2001 | Chou | H01R 13/6658 174/494 |
| 6,208,796 B1* | 3/2001 | Williams Vigliaturo | G02B 6/4453 324/66 |
| 7,416,349 B2* | 8/2008 | Kramer | G02B 6/4452 385/58 |
| 8,184,938 B2* | 5/2012 | Cooke | G02B 6/4455 385/134 |
| 8,433,171 B2* | 4/2013 | Cooke | G02B 6/4453 385/135 |
| 8,452,148 B2* | 5/2013 | Cooke | G02B 6/4455 385/135 |
| 8,596,882 B2* | 12/2013 | Smrha | G02B 6/3825 385/76 |
| 8,958,679 B2* | 2/2015 | Kramer | G02B 6/3825 385/135 |
| 9,059,576 B2* | 6/2015 | Isaacks | H02G 3/00 |
| 9,116,324 B2* | 8/2015 | Cooke | G02B 6/4452 |
| 9,395,507 B1* | 7/2016 | Gross | G02B 6/4446 |

(Continued)

*Primary Examiner* — Rhonda Peace
(74) *Attorney, Agent, or Firm* — Bodi Law LLC

(57) ABSTRACT

A rack system comprising a plurality of removable housing modules each configured to hold a plurality of electronic modules in stepped rows, with the housing modules being arranged on a tray at least partly within a housing in a dense configuration, thereby providing ease of access to the electronic modules for routing wire connectors to each of the electronic modules in an organized manner.

21 Claims, 5 Drawing Sheets

(56) References Cited

U.S. PATENT DOCUMENTS

| | | | |
|---|---|---|---|
| 2010/0054683 A1* | 3/2010 | Cooke | G02B 6/4455 385/135 |
| 2010/0054684 A1* | 3/2010 | Cooke | G02B 6/4455 385/135 |
| 2012/0106911 A1* | 5/2012 | Cooke | G02B 6/4452 385/135 |
| 2016/0085042 A1* | 3/2016 | Lewis | G02B 6/4453 385/135 |

* cited by examiner

HIGH-DENSITY MODULAR WDM SYSTEM—HIGH DENSITY PASSIVE FIBER MODULE (PFM), TRAY AND CHASSIS INTERCHANGEABLE SOLUTION

CROSS-REFERENCES TO RELATED APPLICATIONS

This application claims the benefit of U.S. Provisional Patent Application Ser. No. 62/054,489 filed on Sep. 24, 2014, and incorporated herein by reference.

BACKGROUND

Wavelength Division Multiplexing (WDM) is a technique for increasing the bandwidth of optical network communications. WDM allows many (e.g., dozens) of different data signals to be transmitted simultaneously over a single fiber. To keep the signals distinct, WDM manipulates wavelengths of light to keep each signal within its own narrow band. Depending upon the application, WDM is a generally more cost-effective alternative to Time Division Multiplexing (TDM).

The WDM individual signals are multiplexed (not combined) onto a common media—e.g., fiber optic cable—by the use of filters. These filters can be based on varying technologies. The two most common technologies are Arrayed Waveguide Gratings (AWGs), and Thin-Film Filters (TFFs). AWGs are typically less expensive, but larger, and their performance (namely optical insertion loss) has a greater variation due to temperature than a TFF. TFF filters are typically smaller and more consistent across a wider temperature range.

Regardless of the technology, these filters do require a certain amount of physical space that can be costly, either from a leasing or expansion standpoint. This 'footprint requirement' necessitates the creation of packaging and housing that provides the greatest number of filters (and therefore signals or services) in the smallest amount of space that can still be serviced on an ongoing basis. For service providers and data centers, the metric for 'footprint' is in the 'rack unit'—1.75" (vertically) in a 19" or 23" standard equipment rack deployed in equipment rooms. The less 'rack space' required offers a variety of benefits—from reduced ongoing operational costs associated with the leasing of space in shared or "colocation site", delaying the need to add additional rack space or equipment rooms, as well as other savings from reduced operational and capital equipment and construction costs. However, a means of addressing the relatively large form-factor of current solutions is desired.

SUMMARY

Provided are a plurality of stair stepped modules for holding circuit modules that allow for improved access to up to 24 LC or 12 SC fiber connections per module. Also provided are the stepped modules having flanged left and right sides that keep the modules in place by locking into the rails, but are easily released by gently pulling the modules forward for tilt access, and wherein reversing the bottom row of connectors on the modules allows for easy access to the lowest level of the module in combination with the flange and rail concept. Also provided is a 1RU dense shelf that is a drawer configuration used to house these stepped modules, and a dense chassis that is a 1RU rack mount configuration used to house these stepped modules.

Further provided is a rack system for holding a plurality of circuit modules, said rack system comprising: an outer housing; a plurality of removable housing modules, each housing module having a plurality of rows including at least a bottom row and a top row above the bottom row, the rows being configured to hold a subset of the plurality of circuit modules therein, such that said subset of the plurality of circuit modules are arranged in the housing module in a stepped manner wherein circuit module(s) provided in the bottom row extend further out of a front of the housing module than circuit module(s) provided in the top row; and a tray configured to receive said plurality of housing modules thereon in a removable manner, wherein said tray cooperates with said outer housing such that at least substantial portion of the housing modules are provided within said outer housing.

Also provided is a rack system for holding a plurality of circuit modules, said rack system comprising: an outer housing; a plurality of removable housing modules, each housing module having a plurality of rows including at least a bottom row, a middle row above the bottom row, and a top row above the middle row, the rows being configured to hold a subset of the plurality of circuit modules therein, such that said subset of the plurality of circuit modules are arranged in the housing module in a stepped manner wherein circuit module(s) provided in the bottom row extend further out of a front of the housing module than circuit module(s) provided in the middle row, and wherein circuit module(s) provided in the middle row extend further out of a front of the housing module than circuit module(s) provided in the top row; a tray; and a plurality of rails provided on said tray, said rails being configured on said tray to receive said plurality of housing modules on the tray in a removable manner, wherein said tray cooperates with said outer housing such that at least a substantial portion of the housing modules are provided within said outer housing.

Further provided is a rack system for holding a plurality of circuit modules, said rack system comprising: an outer housing; a plurality of housing modules, each housing module having a plurality of rows including at least a bottom row, a middle row above the bottom row, and a top row above the middle row, the rows being configured to hold two of the plurality of circuit modules therein, such that said subset of the plurality of circuit modules are arranged in the housing module in a stepped manner wherein circuit modules provided in the bottom row extend further out of a front of the housing module than circuit modules provided in the middle row, and wherein circuit modules provided in the middle row extend further out of a front of the housing module than circuit modules provided in the top row; a tray; and a plurality of rails provided on said tray, said rails being configured on said tray to receive at least six of said plurality of housing modules on the tray in a removable manner, wherein said tray cooperates with said outer housing such that a substantial portion but not the entirety of the housing modules are provided within said outer housing, wherein said tray need not be removed from said outer housing for accessing said housing modules.

Also provided is a rack system for holding a plurality of circuit modules, said rack system comprising: an outer housing; a plurality of housing modules, each housing module having a plurality of rows including at least a bottom row, a middle row above the bottom row, and a top row above the middle row, the rows being configured to hold two of the plurality of circuit modules therein, such that said subset of the plurality of circuit modules are arranged in the housing module in a stepped manner wherein circuit modules provided in the bottom row extend further out of a front of the housing module than circuit modules provided in the middle row, and wherein circuit modules provided in the middle row extend further out of a front of the housing module than circuit modules provided in the top row; a tray configured to be removable installed in said outer housing; and a plurality of rails provided on said tray, said rails being configured on said tray to receive at least eight of said plurality of housing modules on the tray in a removable but lockable manner, wherein said tray cooperates with said outer housing such that the entirety of the housing modules are provided within said outer housing when said tray is installed therein.

Also provided are any of the above rack systems wherein a plurality of wire routing hardware is installed on the tray to allow wires connected to each one of the circuit modules to be routed on the tray to a desired location.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Figure 3A:
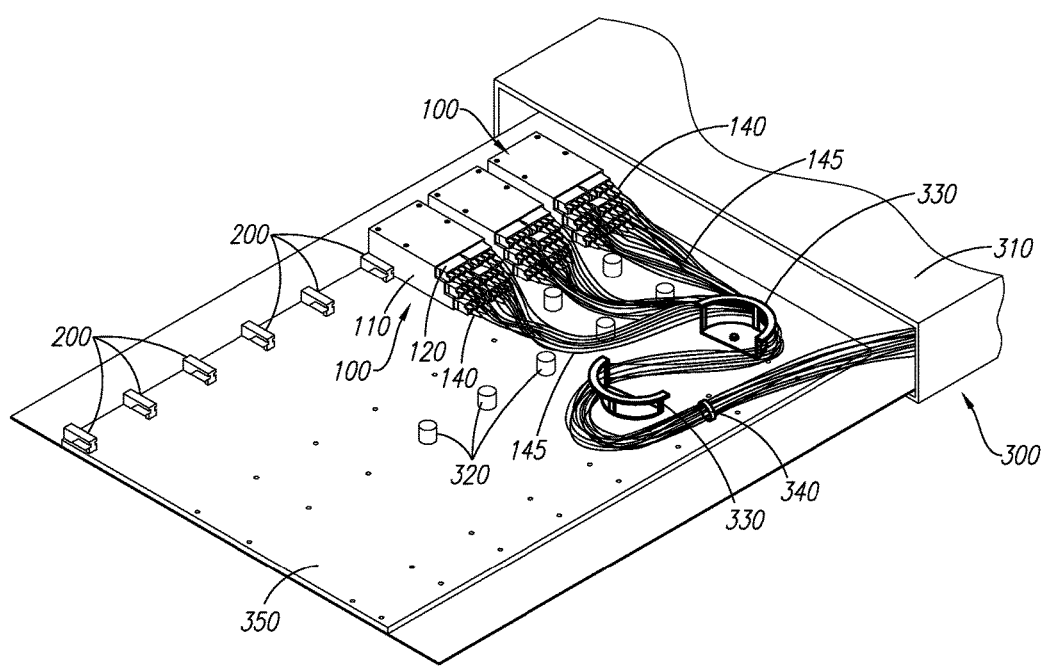
FIG. 3A is a schematic drawing of the example rack drawer unit with removable tray holding a plurality of the example PFM modules.
Figure 3B:
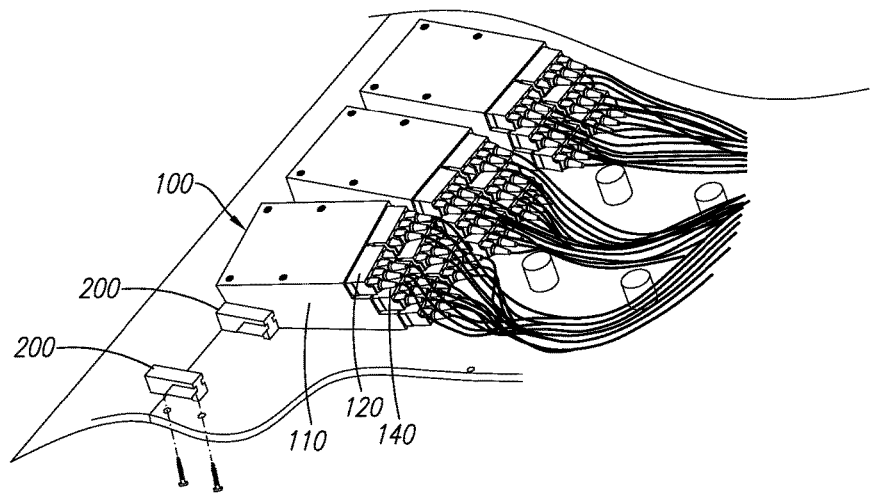
FIG. 3C is a schematic drawing of example wire routing for the example rack drawer of FIGS. 3A and 3B.

Provided are example embodiments of a high density passive fiber module (PFM), with example modules illustrated in FIGS. 1A, 1B and mounting a system illustrated in FIGS. 3A, 3B, and another mounting system shown in FIG. 4 for use therewith, including, but not limited to, a small form-factor passive housing (module) to house the thin-film WDM filters, fibers, and fiber optic connectors. This disclosure also describes a high-density shelf with closing drawer functionality, as well as a first of several high density stationary chassis. Both the drawer-based shelf and stationary chassis can utilize the unique high-density passive fiber module (PFM) design which is interchangeable between these configurations and others to be determined.

The disclosed approach can be used in the following applications: (1) Fiber to the Home applications; (b) Business Ethernet; (c) Cellular Backhaul; (d) CWDM and DWDM Point-to-Point and Rings; (e) Optical Add/Drop Services; (f) Data Center Disaster Recovery; (g) Network Re-arrangement; (h) Network Survivability; and other passive filters or other optical networking equipment.

A number of new optical passive products are disclosed that can use a common PFM module to house mux/demux filters. A server rack mountable 1 RU (rack unit high) drawer that accepts mux, demux, and/or mux/demux modules (up to 8 of them, or more) that can each accept up to 24 LC (or 12 SC) fiber connections in a 2 row or 3 row "stair stepped" design.

Figure 1:
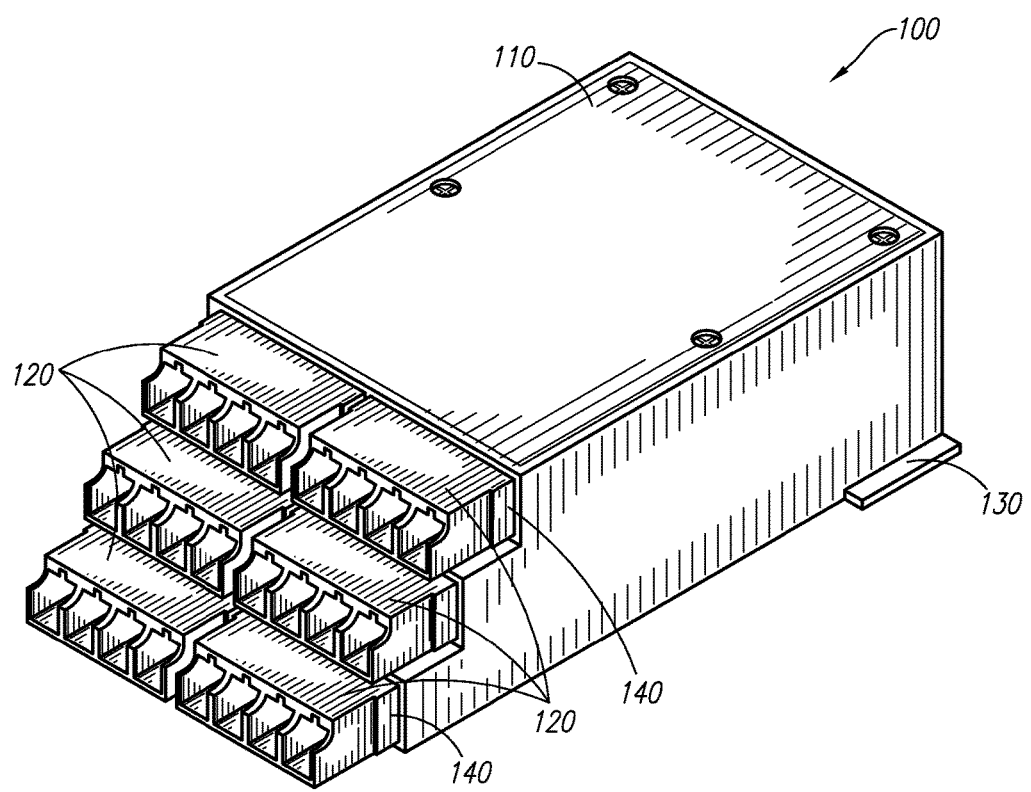
FIG. 1 is a schematic drawing of an example PFM module for housing a plurality of circuit modules.

FIG. 1 shows an example PFM module 100 comprising a plurality of circuit modules 120, which can be comprised of mux/demux filters other circuit modules. The PFM module 100 has a casing 110 and can include a pair of flanges 130 provided at left and right side bottom back edges that allow them to be inserted into drawer unit (such as shown in FIGS. 3A and 4). Note that the example PFM module of FIG. 1 shows three rows of two circuit modules 120 each, although different numbers of such rows can be provided, such as 2 or 4 or some other number. Note that each lower row extends out more than the row above it, causing the three rows 140 to be staggered in a "stair step", which aids in assembling and connecting the modules to their corresponding wiring.

Figure 2A:
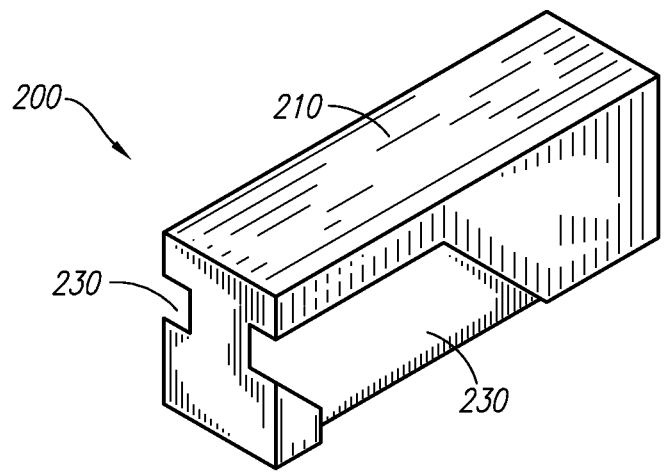
FIGS. 2A, 2B, and 2C are various views of a schematic drawing of an example locking rail for use in the example rack drawer unit of FIGS. 3A and 3B.
Figure 2B:
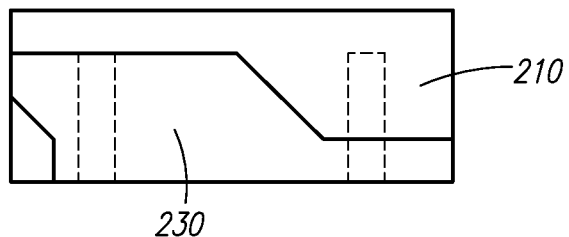
Figure 2C:
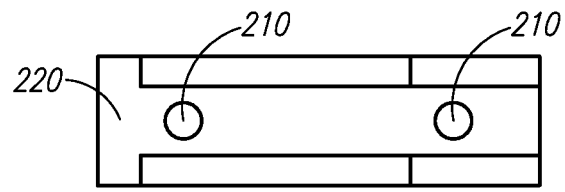

FIGS. 2A, 2B, and 2C show different views of a rail 200 (standoff) component that can be used on a tray to hold the PFM modules in place. As shown in FIG. 3B, the rails 200 can be installed on, and used with, a removable rack drawer 300 (see FIG. 3A and discussion below) to enable the PFM modules 100 to be tilted upward for access by moving the PFM module 100 forward along the rails until the flange 130 is no longer tightly engaged in the corresponding rails 200.

FIG. 3A shows an example rack drawer unit 300 (i.e., a dense shelf configured for an equipment rack) that can be configured with a plurality of the rails 200 on the removable drawer tray 350 for housing a plurality of PFM modules 100 in a housing 310 of the rack drawer unit 300. The housing 310 can be configured to receive the entire tray 350 thereby protecting the entire enclosure into a self-contained unit. The tray 350 can be removably inserted into the housing 310 in a standard manner, and removed (i.e., "pulled out") by a user as desired to obtain access to the respective PFM modules 100 mounted thereon.

Note that each rail 200 may be used to interact with two of the PFM modules 100 mounted on the tray 350, depending on their installed location, and this example rack drawer unit 300 is designed to hold up to 8 of the PFM modules 100, although rack drawers can be provided to house a different number of PFM modules, as desired, including more or less than 8. Through use of the rails 200, the High-Density Passive Fiber (PFM) Modules 100 are held in place securely, but each one of the modules 100 is easily released by gently pulling the modules forward for tilt access to the connectors and/or fiber optic cable terminations and/or for removal.

Figure 3C:
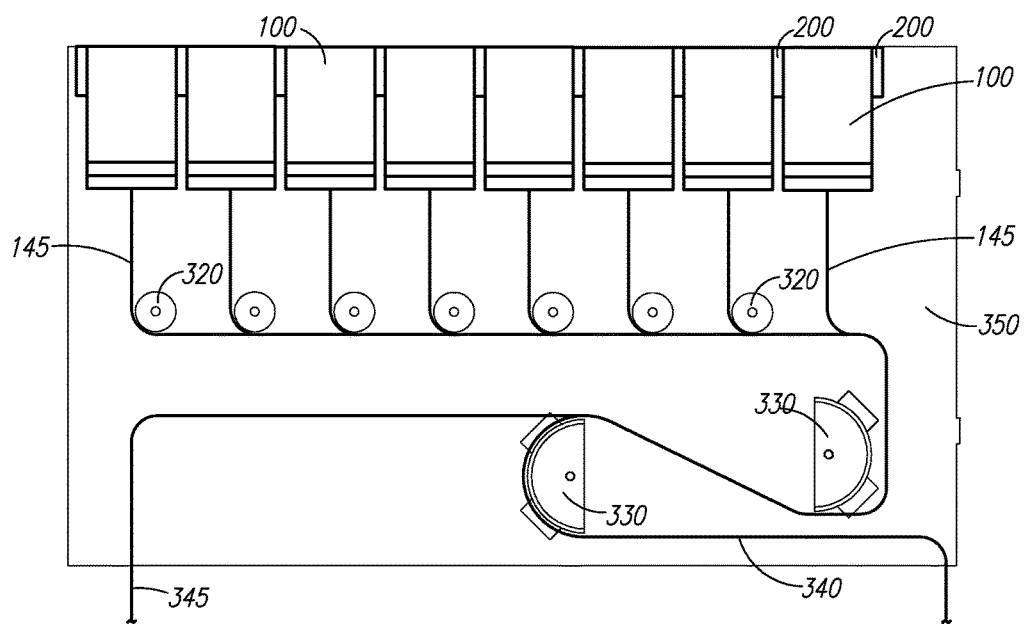

Cable connectors 140 are grouped together 340, with each connector 140 having a plurality of leads for connecting to a respective one of the circuit modules 120. Cable routing posts 320, and radius standoffs 330 are provided for mounting on the tray 350 to aid in the routing of the cables. FIG. 3C shows a possible cable routing path for the drawer 350 of the example rack drawer unit 300. The rack drawer unit can be factory configured for "east or west" fiber routing, but can be modified in the field if required. All pre-mounted hardware can be used in either routing configuration. The open design allows for routing around fiber spools to maintain proper minimum bend radius of fiber during installation as well as movement of the PFM modules 100. Furthermore, the slide out drawer 350 can be provided with an easy-to-follow fiber routing guide screen printed thereon with appropriate fiber lengths as desired for secure movement and bundling of the fibers for the desired PFM module population of any particular drawer unit or tray.

The high-density drawer-based shelf system 300 offers a methodology for fiber slack management as well as configuration for east or west fiber routing. Housings of up to 8 PFMs or more in an easily accessible, configurable tray housing are provided.

The example approach supports reversing the bottom row of connectors in the 3 level stair step design of the PFM module 100 such that the user can tilt the PFM modules 100 upward by moving them slightly forward in the flange accepting rails and turn the entire unit over for easier access to the tightly packed fiber cable connections 140. The unique "stair-stepped" fiber connector configuration allows for improved access to up to 24 LC or 12 SC fiber connections per PFM module. This staggered approach provides ease of labeling, identification, insertion and removal of fibers.

Generally, use of a rack-drawer unit 300 such as the disclosed example provides the following benefits and features: (a) Mounts to standard 19" or 23" racks with reversible rack 'ears' (which can be provided); (b) Supports up to 8 High-Density Fiber Passive fiber modules in 1RU; (c) Supports "tilt access" for easier fiber connection and inspection/testing; (d) Provides multiple bracket mounting options for front, mid, and rear rail configurations; (e) Designed to be compatible with LGX style racks as well as adjustable rail systems; (g) Deep tray with slide out drawer provides full front access to fibers, cables, and PFMs; and (h) Innovative cable management allows for "east or west" fiber routing and proper slack management, routing and movement of the collected fiber bundle.

Figure 4A:
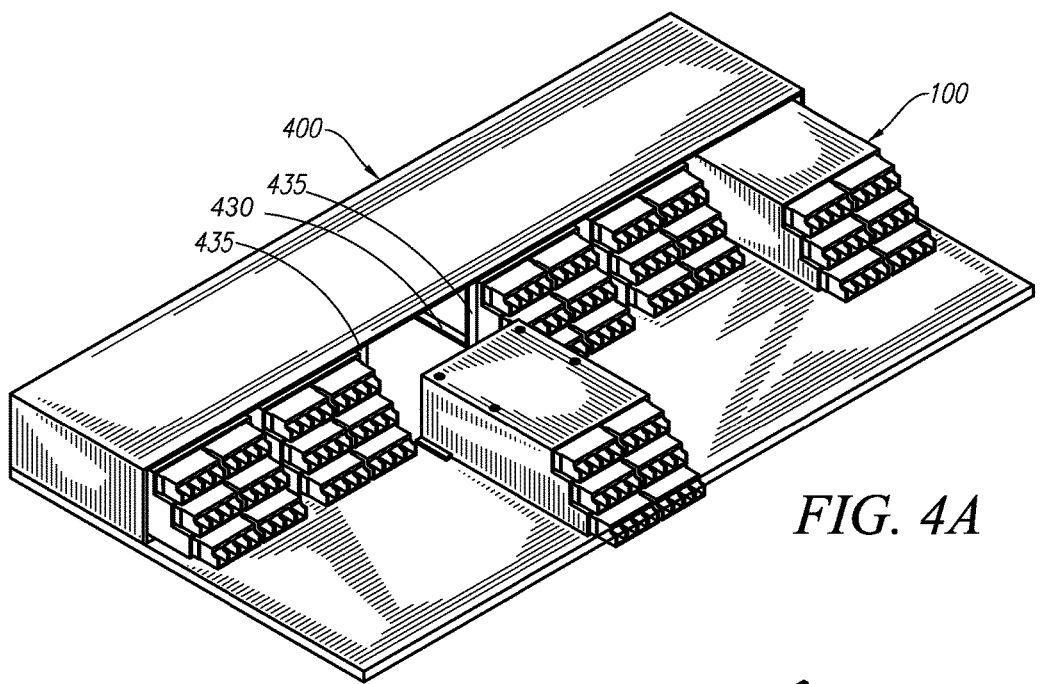
FIG. 4A is a schematic drawing of an example high-density stationary dense chassis with fixed tray holding a plurality of the example PFM modules.
Figure 4B:
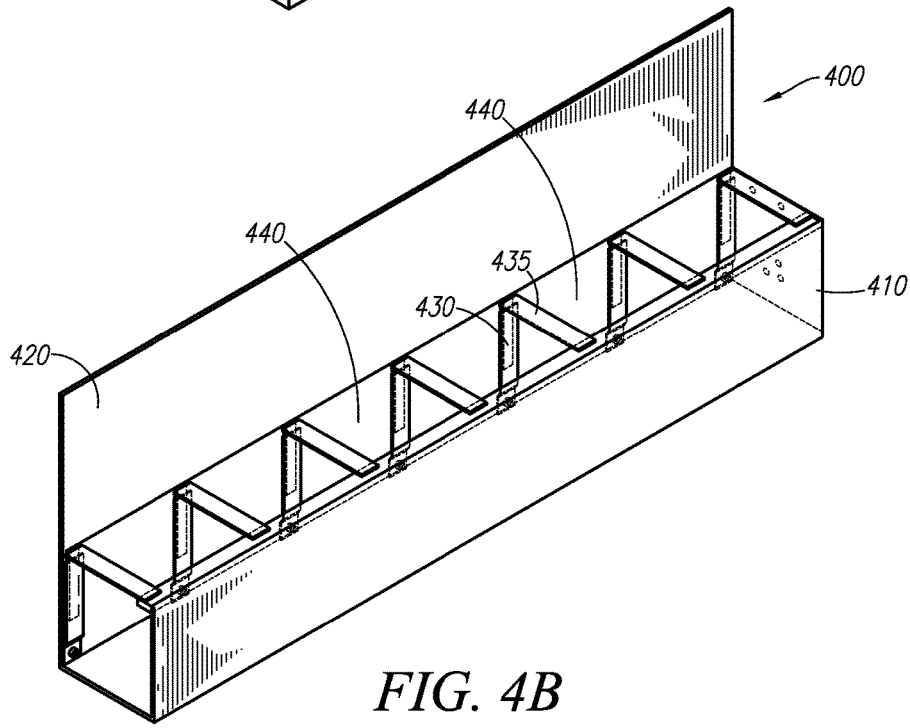
FIG. 4B is another view of the example high-density stationary dense chassis of FIG. 4A.

As an alternative, FIG. 4A shows another populated carrier for the modules that is a high-density stationary dense chassis 400, which can house a plurality of PFM modules 100 on a fixed tray 420 of a compact housing 410. FIG. 4B shows the chassis 400 without the installed PFM modules. The dense chassis 400 is a smaller, lower cost configuration that houses up to 6 modules in the shown example embodiment, although different numbers of modules can be accommodated as desired. The example dense chassis 400 has six bays 440 whereby the modules slide in and out between rails 430, 435. Aside from the modules sliding in and out, there are no other moving parts. Note that this design has a dense packing of the PFM modules 100 which will tend to hold them in place, and hence the rails 430, 435 may not need to lock the modules 100 in place.

The high-density stationary dense chassis 400 offers a smaller footprint with up to a 50% higher density alternative to an LGX-style chassis using LC connectors, and utilizes the same PFM module design for interchangeability between different chassis/shelf options. Hence, the PFM module 100 can be used in a number of different chassis/rack designs.

The PFM module 100 can support circuit module including any variety of WDM filter configurations, up to the maximum fiber connector count, and is not limited to CWDM, or DWDM or any other splitter/combiner, optical taps, and cross-connect fiber optic technology applications. The PFM module 100 can support a variety of standard fiber optic connectors, including but not limited to LC, SC, MU, MTRJ, and MPO connector types. APC and UPC connector types are available.

Some of the include: (a) Mounts to standard 19" or 23" racks with reversible rack 'ears' (provided); (b) Supports up to 6 High-Density Fiber Passive fiber modules in 1RU; (c) Designed to be compatible with LGX style racks as well as adjustable rail systems; (d) Front-of-rack access to all PFMs with a fiber slack stationary tray provides full access to fibers, cables, and PFMs; and (e) Designed for possible future deployments of PFMs housing 'breakout' configurations—routing of multi-fiber ribbons through the back of the chassis with front panel access to the separated fiber strand connections.

The PFM tray-based shelf and chassis designs do not require any power supply or grounding support.

Provided are a plurality of example embodiments, including, but not limited to, a universal PFM design for housing WDM filters, fiber optic cables and/or fiber optics connectors, a high-density drawer-based shelf for housing of up to 8 PFMs as well as providing fiber-slack management, and a high-density stationary chassis for housing up to 6 PFMs with front of rack access. The PFM design lends itself to future integration into other systems including, but not limited to, retrofitted chassis designs, wall mount enclosures, multi-rack unit systems and outside plant housings.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A rack system for holding a plurality of circuit modules, said rack system comprising:
   an outer housing;
   a plurality of unitary removable housing modules, each housing module having a casing configured as a single unit forming an interior cavity configured with a plurality of rows within the cavity, said plurality of rows including at least a bottom row and a top row above the bottom row, the rows being configured to hold a subset of the plurality of circuit modules therein, such that said subset of the plurality of circuit modules are arranged in the housing module in a stepped manner wherein circuit module(s) provided in the bottom row extend further out of a front of the casing of the housing module than circuit module(s) provided in the top row; and
   a tray configured to receive said plurality of housing modules thereon in a removable manner, wherein said tray cooperates with said outer housing such that at least substantial portion of the housing modules are provided within said outer housing.

2. The rack system of claim 1, wherein said tray has a plurality of rails mounted thereon, wherein said rails are configured for securing the plurality of housing modules on the tray.

3. The rack system of claim 2, wherein said rails separate the plurality of housing modules on the tray from each other.

4. The rack system of claim 2, wherein said rails are configured to lock the plurality of housing modules in place.

5. The rack system of claim 1, wherein each one of said housing modules further has a middle row provided between the top row and the bottom row for holding others of said subset of the plurality of circuit modules in a manner extending from the front of the housing module more than the module(s) provided in the top row but less than the module(s) provided in the bottom row.

6. The rack system of claim 5, configured to hold at least 6 of said housing modules, and wherein each one of said housing modules holds 6 of said circuit modules arranged as two circuit modules proved in each of the top, the middle, and the bottom rows.

7. The rack system of claim 5, configured to hold at least 8 of said housing modules, and wherein each one of said housing modules holds 6 of said circuit modules arranged as two circuit modules proved in each of the top, middle, and bottom rows.

8. The rack system of claim 1, configured to hold at least 6 of said housing modules, and wherein each one of said housing modules holds 6 of said circuit modules.

9. The rack system of claim 1, wherein said tray is removable from said outer housing for accessing said housing modules.

10. The rack system of claim 1, wherein said tray need not be removed from said outer housing for accessing said housing modules.

11. The rack system of claim 1, wherein a plurality of wire routing hardware is installed on the tray to allow wires connected to each one of the circuit modules to be routed on the tray to a desired location.

12. A rack system for holding a plurality of circuit modules, said rack system comprising:
an outer housing;
a plurality of unitary removable housing modules, each housing module having a casing configured as a single unit forming an interior cavity configured with a plurality of rows within the cavity, said plurality of rows including at least a bottom row, a middle row above the bottom row, and a top row above the middle row, the rows being configured to hold a subset of the plurality of circuit modules therein, such that said subset of the plurality of circuit modules are arranged in the housing module in a stepped manner wherein circuit module(s) provided in the bottom row extend further out of a front of the housing module than circuit module(s) provided in the middle row, and wherein circuit module(s) provided in the middle row extend further out of a front of the casing of the housing module than circuit module(s) provided in the top row;
a tray; and
a plurality of rails provided on said tray, said rails being configured on said tray to receive said plurality of housing modules on the tray in a removable manner, wherein said tray cooperates with said outer housing such that at least a substantial portion of the housing modules are provided within said outer housing.

13. The rack system of claim 12, configured to hold at least 6 of said housing modules, and wherein each one of said housing modules holds 6 of said circuit modules arranged as two circuit modules proved in each of the top, the middle, and the bottom rows.

14. The rack system of claim 12, configured to hold at least 8 of said housing modules, and wherein each one of said housing modules holds 6 of said circuit modules arranged as two circuit modules proved in each of the top, middle, and bottom rows.

15. The rack system of claim 12, wherein said tray is removable from said outer housing for accessing said housing modules.

16. The rack system of claim 12, wherein said tray need not be removed from said outer housing for accessing said housing modules.

17. The rack system of claim 12, wherein a plurality of wire routing hardware is installed on the tray to allow wires connected to each one of the circuit modules to be routed on the tray to a desired location.

18. A rack system for holding a plurality of circuit modules, said rack system comprising:
an outer housing;
a plurality of unitary housing modules, each housing module having a casing configured as a single unit forming an interior cavity configured with a plurality of rows within the cavity, said plurality of rows including at least a bottom row, a middle row above the bottom row, and a top row above the middle row, the rows being configured to hold two of the plurality of circuit modules therein, such that said subset of the plurality of circuit modules are arranged in the housing module in a stepped manner wherein circuit modules provided in the bottom row extend further out of a front of the housing module than circuit modules provided in the middle row, and wherein circuit modules provided in the middle row extend further out of a front of the casing of the housing module than circuit modules provided in the top row;
a tray; and
a plurality of rails provided on said tray, said rails being configured on said tray to receive at least six of said plurality of housing modules on the tray in a removable manner, wherein said tray cooperates with said outer housing such that a substantial portion but not the entirety of the housing modules are provided within said outer housing, wherein
said tray need not be removed from said outer housing for accessing said housing modules.

19. A rack system for holding a plurality of circuit modules, said rack system comprising:
an outer housing;
a plurality of unitary housing modules, each housing module having a casing configured as a single unit forming an interior cavity configured with a plurality of rows within the cavity, said plurality of rows including at least a bottom row, a middle row above the bottom row, and a top row above the middle row, the rows being configured to hold two divisible ones of the plurality of circuit modules therein, such that said subset of the plurality of circuit modules are arranged in the housing module in a stepped manner wherein circuit modules provided in the bottom row extend further out of a front of the housing module than circuit modules provided in the middle row, and wherein circuit modules provided in the middle row extend further out of a front of the housing module than circuit modules provided in the top row;
a tray configured to be removable installed in said outer housing; and
a plurality of rails provided on said tray, said rails being configured on said tray to receive at least eight of said plurality of housing modules on the tray in a removable but lockable manner, wherein said tray cooperates with said outer housing such that the entirety of the housing modules are provided within said outer housing when said tray is installed therein.

20. The rack system of claim 19, wherein a plurality of wire routing hardware is installed on the tray to allow wires connected to each one of the circuit modules to be routed on the tray to a desired location.

21. A rack system for holding a plurality of circuit modules, said rack system comprising:

an outer housing;

a plurality of unitary removable housing modules, each housing module having a casing configured as a single unit forming an interior cavity configured with a plurality of rows within the cavity, said plurality of rows including at least a bottom row and a top row above the bottom row, each the rows being configured to hold a subset plurality of the plurality of circuit modules therein, such that each subset row of the plurality of circuit modules are arranged in the housing module in a stepped manner wherein circuit module(s) provided in the bottom row extend further out of a front of the casing of the housing module than circuit module(s) provided in the top row; and a tray configured to receive said plurality of housing modules thereon in a removable manner, wherein said tray cooperates with said outer housing such that at least substantial portion of the housing modules are provided within said outer housing.

\* \* \* \* \*